United States Patent
Martin et al.

(10) Patent No.: US 12,005,519 B2
(45) Date of Patent: Jun. 11, 2024

(54) OPTICAL DEVICE AND METHOD FOR PROVIDING TWO OFFSET LASER BEAMS

(71) Applicant: LASER ENGINEERING APPLICATIONS, Seraing (BE)

(72) Inventors: Paul-Etienne Martin, Bordeaux (FR); Sébastien Estival, Talence (FR); Axel Kupisiewicz, Neupré (BE); Jose-Antonio Ramos De Campos, Angleur (BE)

(73) Assignee: LASER ENGINEERING APPLICATIONS, Seraing (BE)

( * ) Notice: Subject to any disclaimer, the term of this patent is extended or adjusted under 35 U.S.C. 154(b) by 781 days.

(21) Appl. No.: 17/261,657

(22) PCT Filed: Jul. 24, 2019

(86) PCT No.: PCT/EP2019/069889
§ 371 (c)(1),
(2) Date: Jan. 20, 2021

(87) PCT Pub. No.: WO2020/020931
PCT Pub. Date: Jan. 30, 2020

(65) Prior Publication Data
US 2021/0260691 A1    Aug. 26, 2021

(30) Foreign Application Priority Data
Jul. 24, 2018   (BE) .................................. 2018/5535

(51) Int. Cl.
*B23K 26/064* (2014.01)
*B23K 26/082* (2014.01)
*G02B 19/00* (2006.01)
*G02B 26/08* (2006.01)
*G02B 26/10* (2006.01)
*G02B 27/28* (2006.01)

(52) U.S. Cl.
CPC .......... *B23K 26/064* (2015.10); *B23K 26/082* (2015.10); *G02B 19/0047* (2013.01);
(Continued)

(58) Field of Classification Search
CPC ................ B23K 26/064; B23K 26/082; B23K 26/0643; B23K 26/0648; B23K 26/0652;
(Continued)

(56) References Cited

U.S. PATENT DOCUMENTS

| 4,572,941 | A | 2/1986 | Sciaky et al. |
| 10,773,339 | B2 | 9/2020 | Sonner et al. |
| 2017/0361401 | A1 | 12/2017 | Estival et al. |

FOREIGN PATENT DOCUMENTS

| CN | 105005149 A | | 10/2015 | |
| DE | 10 2014 200 633 | * | 5/2015 | ............. B23K 26/06 |

(Continued)

OTHER PUBLICATIONS

Written Opinion of the International Searching Authority mailed Oct. 30, 2019, issued in corresponding International Application No. PCT/EP2019/069889, filed Jul. 24, 2019, 6 pages.
(Continued)

*Primary Examiner* — Robert G Bachner
(74) *Attorney, Agent, or Firm* — Christensen O'Connor Johnson Kindness PLLC

(57) ABSTRACT

A method for providing a first and a second laser beam, which are spatially offset in relation to an input laser beam. The method includes: providing a laser source for generating the input laser beam; providing a spatial offsetting unit for providing an offset laser beam that can keep the same polarization between the input laser beam and the offset laser beam; providing a separating unit including a first module for separation by polarization in order to obtain, from the offset laser beam: the first laser beam spatially offset by transmission; and the second laser beam spatially offset by reflection, the first and second spatially offset laser beams being suitable for each describing a circle.

15 Claims, 12 Drawing Sheets

(52) U.S. Cl.
CPC ....... *G02B 26/0816* (2013.01); *G02B 26/101* (2013.01); *G02B 27/283* (2013.01); *G02B 27/286* (2013.01)

(58) Field of Classification Search
CPC ............ B23K 26/0673; B23K 26/0734; B23K 26/0736; B23K 26/0738; B23K 26/0624; G02B 19/0047; G02B 26/0816; G02B 26/101; G02B 27/283; G02B 27/286
See application file for complete search history.

(56) References Cited

FOREIGN PATENT DOCUMENTS

| DE | 102014200633 | B3 | 5/2015 |
|----|--------------|----|--------|
| DE | 102015109984 | A1 | 12/2016 |
| EP | 0131487 | A1 | 1/1985 |
| FR | 2662515 | A1 | 11/1991 |

OTHER PUBLICATIONS

International Preliminary Report on Patentability mailed Jan. 26, 2021, issued in corresponding International Application No. PCT/EP2019/069889, filed Jul. 24, 2019, 1 page.

International Search Report mailed Oct. 30, 2019, issued in corresponding International Application No. PCT/EP2019/069889, filed Jul. 24, 2019, 2 pages.

Written Opinion of the International Searching Authority mailed Oct. 30, 2019, issued in corresponding International Application No. PCT/EP2019/069889, filed Jul. 24, 2019, 7 pages.

\* cited by examiner

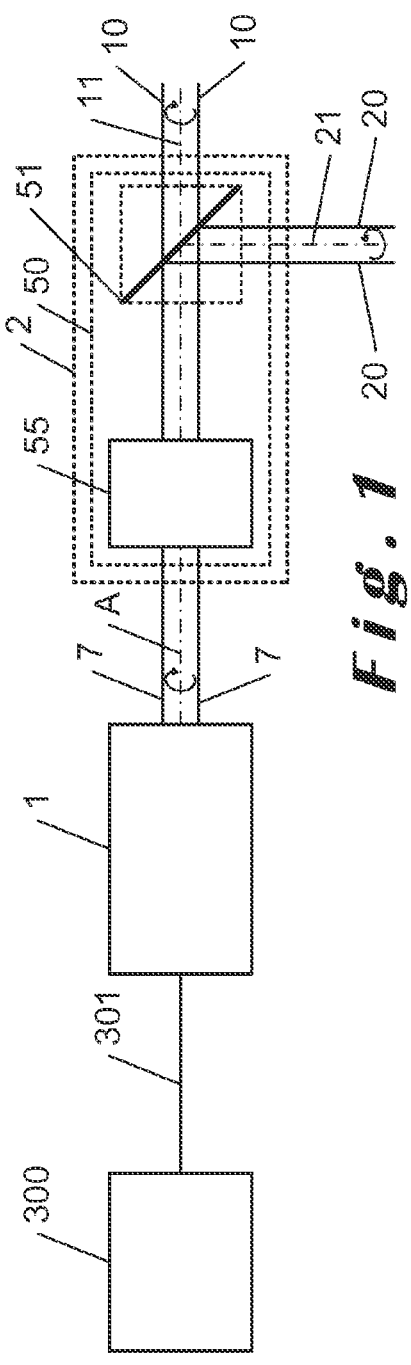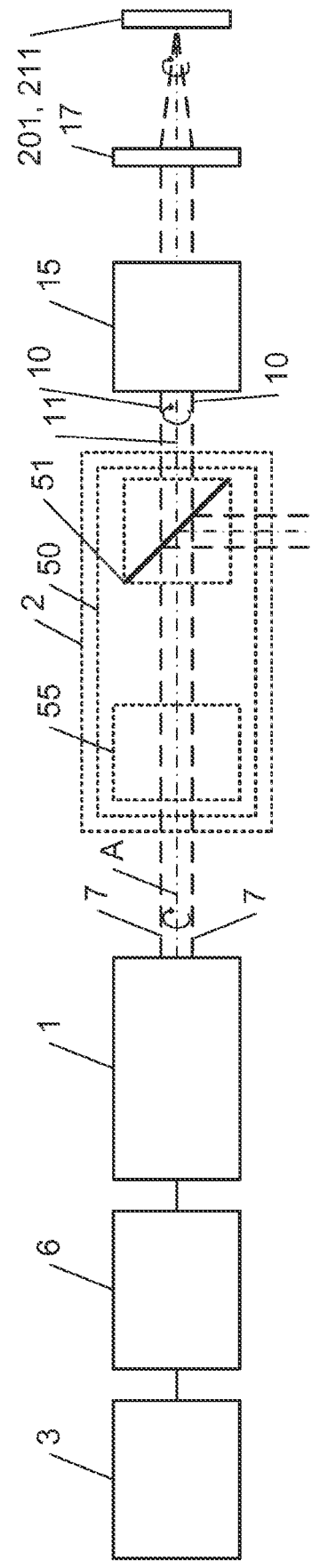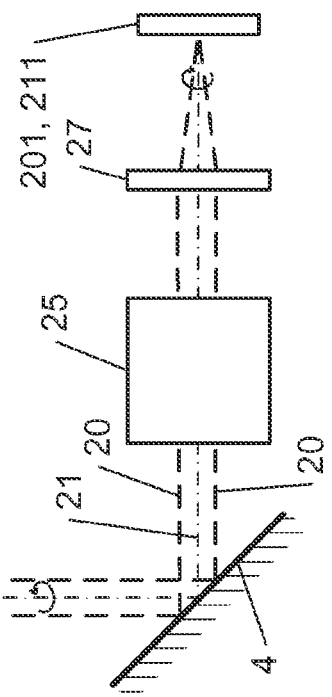
Fig. 1
Fig. 2

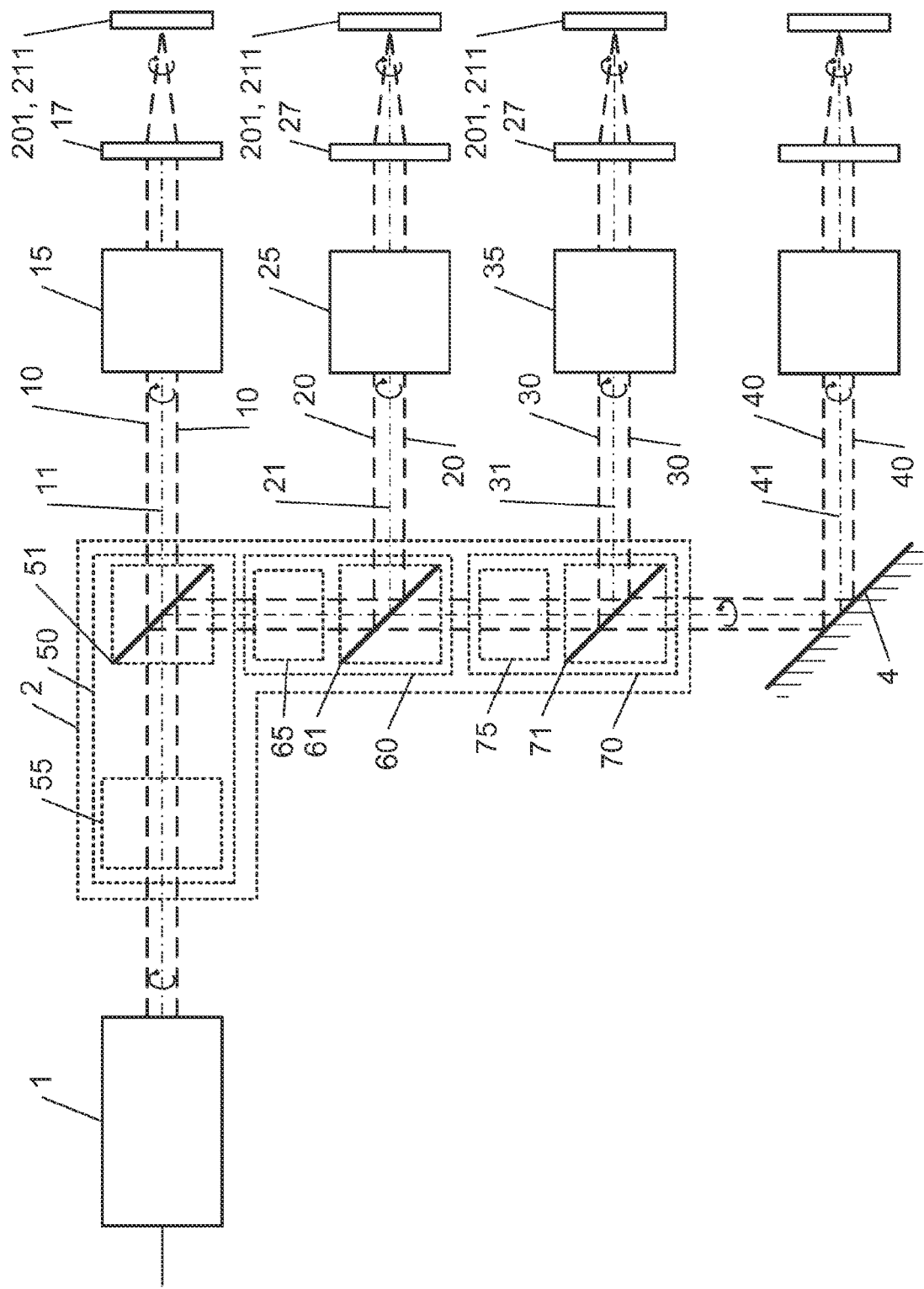

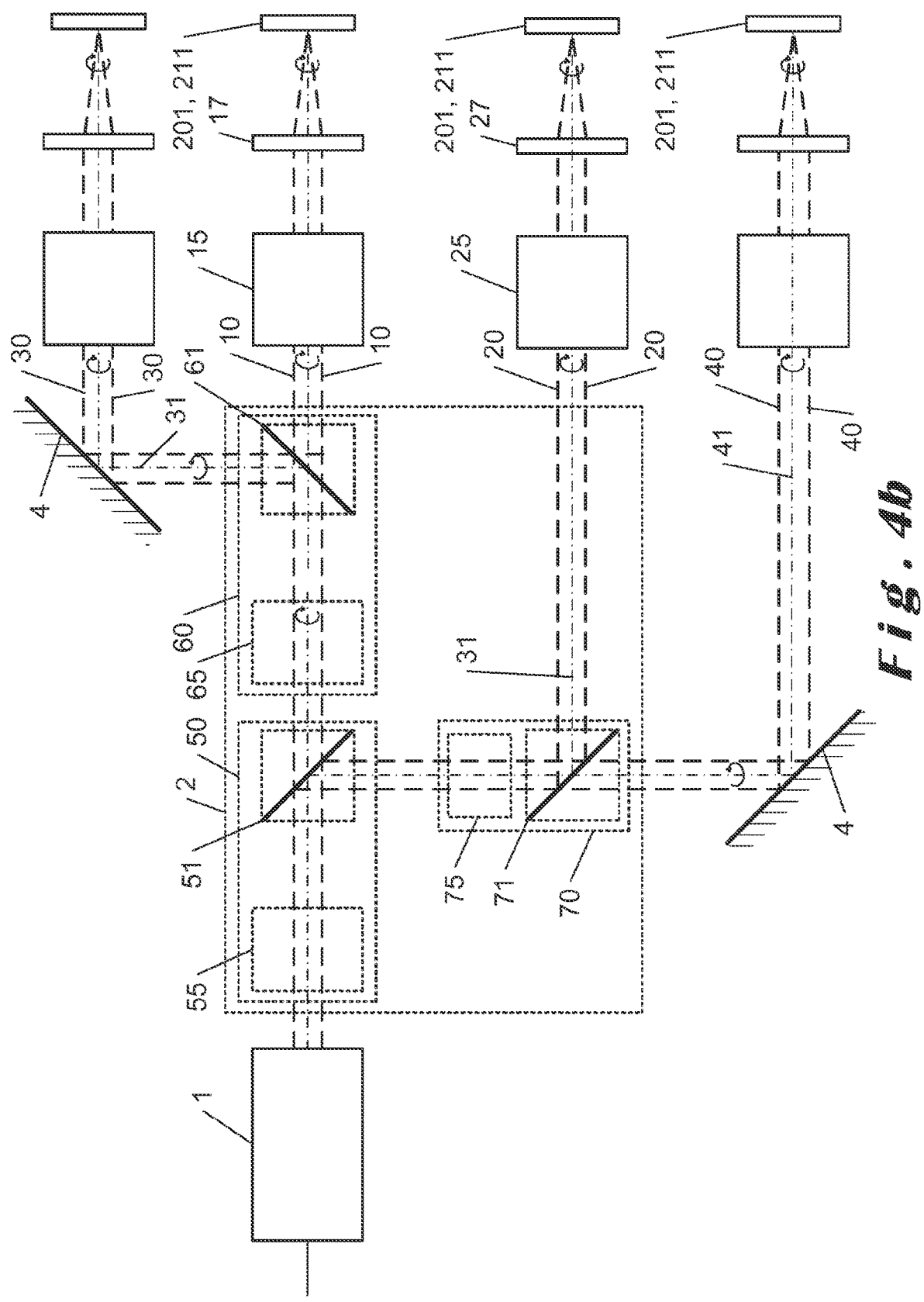

OPTICAL DEVICE AND METHOD FOR PROVIDING TWO OFFSET LASER BEAMS

TECHNICAL FIELD

According to a first aspect, embodiments of the disclosure relate to a method for providing at least two spatially offset laser beams from an input laser beam. According to a second aspect, embodiments of the disclosure relate to an optical device for implementing the method according to the first aspect. According to a third aspect, embodiments of the disclosure relate to a machining system.

BACKGROUND

Laser drilling and cutting processes are known. In order to traverse the surface to be machined with the laser beam, these processes now use more scanning heads (e.g. deflection means, scanner) rather than displacement means of the target. This choice is primarily followed for reasons of ease of use and machining speed. Due to the Gaussian distribution of the laser beam, the use of a scanner leads to machining operations with conical cutting faces, i.e. they are not straight. For some applications, this is not acceptable.

In order to control or eliminate the conicity of the cutting faces, precession heads have been developed. These precession heads control the angle of attack of the laser beam on the target to be machined. This control of the angle of attack allows better control of the conicity of the cutting faces.

Ultra-short pulse sources with average powers in excess of a hundred watts (and with pulse energies above 100 µJ) are now available on the market, allowing an increase in productivity by increasing the machining speed. However, the use of such a laser source for the machining of a workpiece, without lowering the average power of the laser source, is generally not possible, because of thermal effects on the target that can lead to its deformation (or even destruction), oxidation, or structural modification. In order to limit such thermal effects, there are gas nozzles that allow an air blast to be blown onto the target to be machined in order to locally reduce the temperature. However, gas nozzles are bulky and their effectiveness can be limited. In addition, the gas nozzles can generate pressure on the target, which can displace or even degrade it.

The current solutions do not allow the use of laser sources that can exceed a hundred Watts with a precession movement due to thermal effects.

SUMMARY

According to a first aspect, one of the purposes of the present disclosure is to provide a method for exploiting a powerful laser source for precession machining without generating or by reducing harmful thermal effects.

For this purpose, the inventors propose a method for providing at least a first and a second laser beam spatially offset with respect to an input laser beam (e.g. laterally offset) and comprising the following steps:

a. providing a laser source for generating the input laser beam such that it has a fixed polarization in time;
b. providing a spatial offsetting unit for providing an offset laser beam (e.g. laterally offset) with respect to the input laser beam, the offset laser beam having a main propagation axis A and being suitable for describing a circle in a plane perpendicular to this main propagation axis A, the spatial offsetting unit being able to maintain the same polarization between the input laser beam and the offset laser beam;
c. providing a separating unit comprising a first separation module comprising a first polarization separation means for obtaining from the offset laser beam:
   the first laser beam spatially offset by transmission (e.g., laterally offset) having a first main propagation axis, and
   the second laser beam spatially offset by reflection (e.g. laterally offset) having a second main propagation axis;
the separating unit being configured such that the first and second spatially offset laser beams are suitable for describing a circle in a plane perpendicular to the first and second main propagations axes respectively.

Preferably, the method according to the disclosure further comprises providing (e.g. after step a) a collimation adjustment system (this makes it easier to adapt to different thicknesses of target samples). The method according to the disclosure is preferably intended for laser machining of workpieces, more preferably for laser micromachining of workpieces.

The method of the disclosure makes it possible to obtain a laser source and a lateral offsetting unit, two laterally offset laser beams so that two machining operations can be performed with two separate laser beams from a single source and laterally offset by a single lateral offsetting unit. Thanks to the disclosure, it is possible to operate a powerful laser source without generating or reducing harmful thermal effects because the source laser beam is subdivided into several downstream laser beams. The lateral offset imposed by the spatial offsetting unit can be maintained for the first and second laterally offset laser beams. This preservation of the offset is possible thanks to the combination of the lateral offsetting unit, which is able to preserve the same polarization between the input laser beam and the offset laser beam, and the unit for separating by polarization.

Preferably, the optical device of the disclosure is suitable for generating a one-dimensional lateral offset, i.e., the offset light beam describes a line in a plane perpendicular to the main propagation direction of the offset laser beam. More preferably, the lateral offsetting unit is suitable for generating an offset in two dimensions, i.e. the offset light beam describes a circle, an ellipse, ... in a plane perpendicular to the main propagation direction of the offset laser beam. With the optical device of the disclosure, it is also possible to generate any trajectory with the laser beam in a plane perpendicular to its main propagation direction. The lateral offset means that the laser beam is always laterally offset with respect to a main propagation direction of the offset laser beam. Thus, the offset laser beam propagates parallel to a main propagation direction. For example, the offset laser beam propagates parallel to the main propagation axis A. Therefore, when the lateral offsetting unit generates an offset such that the offset laser beam is able to describe a circle in a plane perpendicular to the main propagation axis A, the offset laser beam propagates by rotating around the main propagation axis A.

An advantage of the disclosure is that the separating unit allows the conservation of the lateral offset around a main propagation direction A. Indeed, the separating unit allows separation towards a first and a second laser beam laterally offset along a first and a second main propagations axes respectively so that the laterally offset laser beams and the main propagation axes retain their respective lateral offsets. Thus, it is possible to use a single lateral offsetting unit to perform at least two machining operations, identical or different, simultaneously. This is achieved by using a lateral offsetting unit that is able to maintain the same polarization between the input laser beam and the offset laser beam and does not induce any angular offset of the offset laser beam. This is essential in order to be able to separate the beam while keeping the lateral offset with high fidelity. In addition, the separating unit is relatively simple and compact. The separating unit also offers good control of the power distribution of the separated beams.

Another advantage of being able to separate an offset laser beam by the method of the disclosure is the ability to perform multiple precession machining using the same precession module (spatial offsetting unit) and modulating the flux (intensity) of each spatially offset laser beam. It is also easy, with the solution of the disclosure, to stack several separating units to generate 2, 3, 4 or more offset laser beams.

Preferably, a circle described by the offset laser beam is centered on the intersection of the main axis A with the plane perpendicular to the main axis A.

Preferably, the spatial offsetting unit is downstream of the laser source. Preferably, the separating unit is positioned downstream of the spatial offsetting unit.

An advantage of the method of the disclosure is to provide an offsetting unit that does not change the polarization of the offset laser beam. Therefore, it is possible to use polarizing means, e.g., a polarizing cube, a polarizing plate, a brewster plate . . . to separate the offset laser beam into at least two offset laser beams. Indeed, the advantage of the spatial offsetting unit of the disclosure is that it does not rotate the polarization of the laser beam. Indeed, there are spatial offsetting units that induce a rotation of the polarization, which makes the separation of the beam with polarizing optics particularly complex, unless there are means for separating the polarization that would rotate synchronously with the beam. Thanks to the spatial offsetting unit included in the disclosure, it is therefore possible to offset the beam spatially (e.g. laterally) without the beam rotating on itself, so that its polarization remains constant in time.

Preferably, the spatial offsetting unit is suitable for changing a spatial offset between the input laser beam and the offset laser beam.

Preferably, the first main propagation axis is perpendicular to the second propagation axis.

A polarizing cube or a polarizing plate allows to transmit and reflect a light beam with an angle of 90°, preferably when the offset laser beam has an incidence of 45° with the surface of the polarizing element.

Preferably, the first separation module comprises a polarization management means upstream of the first polarization separation means.

The advantage of using polarization management means for the separation of an offset laser beam is to be able to adjust/control the power of the offset laser beam that is reflected and the power that is transmitted by at least one retardation plate. Preferably, the polarization management means (a retardation plate for example) is positioned upstream of the polarization separation means allowing to separate the offset laser beam. Thus, a rotation of this at least one retardation plate around its optical axis allows to modify the polarization of the offset laser beam so as to change the transmitted and reflected fraction. Such separation means comprising a polarizing means associated with at least one retardation plate can be cascaded to obtain more than two laterally offset beams.

Preferably, the polarization management means comprises a retardation plate, preferably a half-wave plate, so that a rotation of the retardation plate induces a modulation of a transmitted power and a reflected power by the first polarization separation means.

Preferably the polarization management means comprises two retardation plates, preferably two quarter-wave plates, such that a rotation of at least one of the two quarter-wave plates induces a modulation of a transmitted power and a reflected power by the first polarization separation means.

For example, the polarization management means comprises two quarter-wave plates. For example using two quarter-wave plates allows to separate an offset laser beam having a circular polarization with a polarizing means so as to obtain 50% of the power of the offset laser beam to the transmitted beam and 50% to the reflected beam by estimating that 100% of the offset laser beam is transmitted and reflected. Similarly, by rotating one and/or the other quarter-wave plate, it is possible to distribute 75% or ⅔ towards the reflected beam and 25% or ⅓ respectively towards the transmitted beam or vice versa. Such a distribution makes it possible to carry out cascaded beam separations so that three or four separate laser beams having equal power can be obtained from the laser source and the offsetting unit, so that simultaneous machining can be carried out with equal laser powers. This is particularly advantageous in terms of productivity and quality. The advantage of the two quarter-wave plates is that an offset laser beam with elliptical polarization can be distributed in a controlled manner.

For example, the at least one retardation plate is a half-wave plate. For example the use of a half-wave plate allows to separate an offset laser beam having a linear polarization with a polarizing means so as to obtain 50% of the power of the offset laser beam towards the transmitted beam and 50% towards the reflected beam by estimating that 100% of the offset laser beam is transmitted and reflected. With a slight modification, the transmitted and reflected powers can be finely adjusted so that they are strictly equal or correspond to a predefined value. By rotating the half-wave plate, it is possible to distribute 75% or ⅔ to the reflected beam and 25% or ⅓ respectively to the transmitted beam or vice versa. Such a distribution makes it possible to carry out cascaded beam separations so that three or four separate laser beams of equal power can be obtained from the laser source and the offsetting unit so that simultaneous machining can be carried out with equal laser powers. This is particularly advantageous from the point of view of productivity and quality of a machining system comprising the present device.

Preferably, the method according to the disclosure includes the following additional steps:

d. providing a first and a second deflection means positioned downstream of the separating unit for directing the first and second spatially offset laser beams toward at least one workpiece;

e. providing a first and a second focusing means positioned downstream of the first and second deflection means respectively, so as to focus the first and second spatially offset laser beams onto the at least one workpiece.

The addition of deflection means, e.g. galvanometric heads, scanners, motorized mirrors to deflect an offset laser beam issued from the separation is possible with the combination of the lateral offsetting unit and the separating unit. This is made possible because neither the lateral offsetting unit nor the separating unit induces an angular offset with respect to a main propagation axis around which the laser beam is offset and describes a circular path parallel to these main propagation axes. Thus, the use of a scanner head is particularly suitable. To give an example of angular offset of the laser beam with respect to a main propagation axis, consider a converging lens that induces to an incident beam parallel to the optical axis of the lens but not coincident with the optical axis, an angular offset since the beam is then focused at the focal point of the lens so that the beam will intersect the optical axis at the focal point. This case illustrates an angular offset of the light beam which could be summarized by a modification of the path of the light beam without modification of the referential, i.e. the optical axis/ main propagation axis.

Based on the same principle as described above, focusing means allow precession machining using the angular offset induced by the focusing means to the laterally offset laser beam describing a circle on the focusing means, e.g. F-theta optics.

According to a second aspect, one of the goals of the present disclosure is to propose an optical device to increase the productivity of a laser system while guaranteeing machining with controlled conicity. Another purpose of the present disclosure is to propose a device for providing several laterally offset laser beams from one laterally offset laser beam in order to be able to perform several machining operations simultaneously from a single laterally offset laser beam.

For this purpose, the inventors propose an optical device for laser machining comprising:
  a spatial offsetting unit for obtaining from an input laser beam an offset laser beam having a main propagation axis A and suitable for describing a circle in a plane perpendicular to this main propagation axis A;
  a separating unit comprising a first separation module comprising a first polarization separation means for obtaining from the offset laser beam:
    a first spatially laser beam offset by transmission having a first main propagation axis, and
    a second spatially laser beam offset by reflection with a second main propagation axis;
  the spatial offsetting unit being able to maintain the same polarization between the input laser beam and the offset laser beam;
  the separating unit being configured such that the first and second spatially offset laser beams are suitable for describing a circle in a plane perpendicular to the first and second main propagations axes respectively.

The different variations and advantages described for the method according to the first aspect of the disclosure apply to the optical device according to the second aspect, mutatis mutandis. Preferably, the optical device of the disclosure further comprises a collimation adjustment system which allows for easier adaptation to different thicknesses of target samples.

The optical device of the disclosure uses a spatial offsetting unit (e.g. lateral) which when combined with focusing means is well suited for drilling and cutting. The advantage of the spatial displacement unit of the device of the disclosure is that it can be used with mechanical displacement means of a workpiece as well as with deflection means, i.e. a scanner, a galvanometric head with the same ease of use as conventional deflection means. An advantage of the spatial displacement unit (e.g. lateral) included in the disclosure is that it is compatible with the use of scanners and F-Theta lenses. The device of the disclosure therefore makes it possible to carry out machining operations with machining fields of up to 30×30 mm, with controlled conicity (positive, zero or negative) only with the deflection device.

The device of the disclosure comprises a separating unit placed after the lateral offsetting unit so that several machining operations with precession of the laser can be carried out simultaneously using scanners with a single laser source and a single lateral offsetting unit. The optical device of the disclosure allows the machining of at least two workpieces with a single laser source and a single lateral offsetting unit for generating the precession of at least two laser beams on at least one workpiece. The advantage of the optical device of the disclosure is that it allows the machining of at least two workpiece or substrates simultaneously without requiring one lateral displacement unit per workpiece machined simultaneously, thus allowing identical or even different machining operations at a lower cost.

The advantage of the machining device of the disclosure is that the spatial offsetting unit (e.g. lateral) does not change the polarization of the offset laser beam. Therefore, it is possible to use polarization means, e.g. a polarizing cube, a polarizing plate, a brewster plate . . . to separate the offset laser beam into at least two offset laser beams. Indeed, the advantage of the spatial offsetting unit of the device of the disclosure is that it does not rotate the polarization of the laser beam. This is particularly advantageous in comparison with other existing spatial offset devices that induce a rotation of the polarization, and therefore an impossibility to separate the beam with polarizing optics, unless there are polarization separation means available that would rotate in a completely synchronized manner with the beam (very difficult to implement). Thanks to the spatial offsetting unit included in the disclosure, it is thus possible to offset the beam spatially (for example laterally) without the beam rotating on itself, so that its polarization remains constant in time.

Preferably, the first separation module comprises:
  a first polarization separation means to obtain:
    by transmission, the first spatially offset laser beam,
    by reflection, the second spatially offset laser beam.

An offset laser beam separation based on semi-reflecting mirrors is possible although such a separation does not offer the possibility of fine adjustment of the power of the separate laser beams.

Preferably, the optical device of the disclosure further comprises a mirror for reflecting the first or second spatially offset laser beam.

Such a mirror makes it possible to have the first and second spatially offset laser beams parallel in fine so as to be able to send them in the same direction, preferably to two deflection means positioned side by side.

Preferably, the first polarization separation means is chosen among one of the following polarizing means:
  a polarizing cube;
  a 56° Brewster plate;
  a 45° polarizing mirror.

Preferably, the first separation module comprises a polarization management means upstream of the first polarization separation means.

Preferably, the polarization management means comprises a retardation plate, preferably a half-wave plate, such that rotation of the retardation plate induces a modulation of a transmitted power and a reflected power by the first polarization separation means. Preferably, the rotation of a retardation plate is achieved by rotating the plate on itself, i.e. around its optical axis.

Preferably, the polarization management means comprises two retardation plates, preferably two quarter-wave plates, such that a rotation of at least one of the two quarter-wave plates induces a modulation of a transmitted power and a reflected power by the first polarization separation means.

Preferably, the spatial offsetting unit comprises:
- a first lateral offsetting unit for obtaining a laser beam offset according to a direction X in a plane perpendicular to the main propagation axis A;
- a second lateral offsetting unit for obtaining a laser beam offset according to a direction Y in a plane perpendicular to the main propagation axis A;
- the directions X and Y preferably being orthogonal to each other;
- the first and the second lateral offsetting unit being optically coupled so that they are suitable for offsetting an input laser beam to obtain an offset laser beam suitable for describing a circle in a plane perpendicular to the main propagation axis A.

Preferably, the first and second lateral offsetting unit comprises a plate suitable for being rotated so as to offset a laser beam to obtain a laser beam offset according to a direction X and Y respectively in a plane perpendicular to the main propagation axis A. Preferably, the first or the second lateral offsetting unit comprises a plate rotatable so as to offset a laser beam to obtain a laser beam offset according to a direction X or Y respectively in a plane perpendicular to the main propagation axis A.

Preferably, the first and second lateral offsetting unit comprises:
- a movable mirror so that its normal is suitable for describing a trajectory in two-dimensional space,
- an optical return system configured to redirect a first input reflection of the laser beam from the movable mirror to the movable mirror so as to obtain for all the possible positions and orientations of the movable mirror, a beam offset according to a direction X and Y respectively.

Preferably, the first or second lateral offsetting unit comprises:
- a movable mirror such that its normal is suitable for describing a trajectory in a two-dimensional space,
- an optical return system configured to redirect a first input reflection of the laser beam from the movable mirror to the movable mirror so as to obtain for all the possible positions and orientations of the movable mirror, a beam offset according to a direction X or Y respectively.

Preferably, the first and/or second lateral offsetting unit comprises:
- a movable mirror such that its normal is suitable for describing a trajectory in two-dimensional space,
- a first and a second fixed mirror configured such:
  - that a first input reflection of the laser beam on the movable mirror is directed towards the first fixed mirror,
  - that a second reflection on the first fixed mirror is directed to the second fixed mirror,
  - that a third reflection on the second fixed mirror is directed towards the movable mirror, and,
  - that a fourth output reflection on the movable mirror, allow to obtain for all the possible positions and orientations of the movable mirror, a beam offset according to a direction X and/or Y respectively.

Preferably, the optical return system comprises:
- a first and a second fixed mirror configured such:
  - that a first input reflection of the laser beam from the movable mirror is directed to the first fixed mirror,
  - that a second reflection on the first fixed mirror is directed to the second fixed mirror,
  - that a third reflection on the second fixed mirror is directed to the movable mirror, and,
  - that a fourth output reflection on the movable mirror, allow to obtain for all the possible positions and orientations of the movable mirror, a beam offset according to a direction X and/or Y respectively.

Preferably, the first and/or second lateral offsetting unit comprises:
- a first movable mirror so that its normal is suitable for describing a trajectory in two-dimensional space;
- a second movable mirror so that its normal is suitable for describing a trajectory in the two-dimensional space;
- the normals of the first and second movable mirrors being parallel for all the possible positions and orientations of the first and second movable mirrors, and, the first and second movable mirrors being configured such:
  - that a first input reflection of the laser beam on the first movable mirror is directed to the second movable mirror,
  - that a second reflection on the second movable mirror makes it possible to obtain for all the possible positions and orientations of the first and second movable mirrors, a beam offset according to a direction X and/or Y respectively.

Preferably, the first and second lateral offsetting unit comprises:
- a first movable mirror such that its normal is suitable for describing a trajectory in a two-dimensional space;
- a second movable mirror such that its normal is suitable for describing a trajectory in the two-dimensional space;
- the normals of the first and second movable mirrors being parallel for all the possible positions and orientations of the first and second movable mirrors, and, the first and second movable mirrors being configured such:
  - that a first input reflection of the input laser beam on the first movable mirror is directed to the second movable mirror;
  - that a second reflection on the second movable mirror allows to obtain, for all the possible positions and orientations of the first and second movable mirrors, a beam laterally offset according to a direction X;
  - that a third reflection of the laterally offset beam on the first movable mirror is directed towards the second movable mirror;
  - that a fourth reflection on the second movable mirror makes it possible to obtain, for all the possible positions and orientations of the first and second movable mirrors of the first and second lateral offsetting unit, an offset laser beam suitable for describing a circle in a plane perpendicular to its main propagation axis A.

Preferably, the spatial offsetting unit comprises:
- a first lateral offsetting unit comprising:
  - a first movable mirror so that its normal is able to describe a trajectory in a two-dimensional space;
  - a second movable mirror so that its normal is suitable for describing a trajectory in the two-dimensional space;
  - the normals of the first and second movable mirrors being parallel for all the possible positions and orientations of the first and second movable mirrors, and, the first and second movable mirrors being configured such that:

that a first input reflection of the laser beam from the first movable mirror is directed to the second movable mirror, that a second reflection on the second movable mirror allows to obtain for all the possible positions and orientations of the first and second movable mirrors, a beam offset according to a direction X or Y;

a second lateral offsetting unit comprising:
a plate suitable for being rotated so as to offset a laser beam to obtain an offset laser beam according to a direction X or Y respectively in a plane perpendicular to the main propagation axis A;

the first and second lateral offsetting units are configured such that the plate is positioned between the first and second movable mirrors so that the first reflection on the first movable mirror is directed toward the second movable mirror by passing through the plate.

Preferably, the spatial offsetting unit comprises:
a first movable mirror so that its normal is suitable for describing a trajectory in a three-dimensional space;
a second movable mirror so that its normal is suitable for describing a trajectory in the three-dimensional space;
the normals of the first and second movable mirrors being parallel for all the possible positions and orientations of the first and second movable mirrors, and, the first and second movable mirrors being configured such:
that a first input reflection of the laser beam from the first movable mirror is directed to the second movable mirror,
that a second reflection on the second movable mirror makes it possible to obtain, for all the possible positions and orientations of the first and second movable mirrors, an offset laser beam suitable for describing a circle in a plane perpendicular to this main propagation axis A.

Preferably, the spatial offsetting unit comprises:
a movable mirror so that its normal is suitable for describing a trajectory in three-dimensional space,
an optical return system configured to redirect a first input reflection of the laser beam on the movable mirror, towards the movable mirror so as to obtain for all the possible positions and orientations of the movable mirror, an offset laser beam suitable for describing a circle in a plane perpendicular to this main propagation axis A.

Preferably, the optical return system is a retro-reflection system, preferably a retro-reflector.

Preferably, the spatial offsetting unit comprises:
a mirror:
having a substantially planar reflecting surface defined by a normal to obtain a first reflected laser beam from the input laser beam,
movable such that its normal is suitable for describing a trajectory in three-dimensional space;
the spatial offsetting unit being configured such that the input laser beam and the normal of the mirror are separated by an angle between 0° and 15°, preferably between 0.010 and 10°, more preferably between 0.1° and 8° and even more preferably between 0.1° and 3°, for all the possible positions and orientations of the movable mirror;
driving means for displacing the movable mirror;
a retro-reflection system:
positioned with respect to the mirror to obtain from the first reflected laser beam a second incident laser beam on the mirror for all the possible positions and orientations of the mirror, to obtain the offset laser beam from a reflection of the second incident laser beam on the movable mirror, and
suitable for providing the second incident laser beam on the mirror, parallel to the first reflected laser beam for all the possible positions and orientations of the movable mirror.

An advantage of this embodiment is that it is particularly well adapted to a use of polarization to modulate the flux (or intensity) on each of the channels, i.e. towards the first, second, third, . . . spatially offset laser beams. It is then possible and easily feasible to stack different beam separation systems to generate 2, 3, 4 spatially offset laser beams. So we have something very modular. The spatial offsetting unit of this embodiment keeps the output polarization. It is therefore possible to obtain the different spatially offset laser beams using a polarization separation principle. This is not the case with other known systems.

Preferably, the retro-reflection system is movable in translation with respect to the mirror. It is also possible to provide a movable mirror in translation with respect to the retro-reflection system.

The advantage of the offsetting unit included in the disclosure is that it is relatively light and compact. In addition, the offset upstream of the separating unit, the deflection means and the focusing means and thus the angle of attack on the substrate can be easily controlled by the relative positioning of the mirror with the retro-reflection system.

The offsetting unit of the disclosure could be called a two-dimensional (2D) offsetting unit. The offset laser beam can represent a trajectory (or motion) in a three-dimensional space upstream of the separating unit. In other words, the lateral offsetting unit of the disclosure is suitable for imposing a 2D offset (in at least two non-parallel directions) between an offset laser beam and a main direction of propagation of the laser beam (and not only in one direction). This 2D property for the offset is possible with the offsetting unit of the disclosure because the normal to the mirror is suitable for representing a trajectory in three-dimensional space, and also through the use of the retro-reflector (or retroreflector). One could say, equivalently, that the mirror is movable so that its normal is suitable for representing a movement in a three-dimensional space. The retroreflection system is suitable for providing a second incident laser beam to the movable mirror that is parallel to a first reflected laser beam for all the possible positions and orientations of the movable mirror. It is possible, with the offsetting unit of the disclosure, to have a second incident laser beam on the movable mirror parallel to a first reflected laser beam regardless of the plane defined by the first incident laser beam and the mirror normal to the mobile. This is made possible by the use of the retro-reflection system. Since a first reflected laser beam and a second incident laser beam have opposite directions along a same line, we could say that the first reflected laser beam and the second incident laser beam are anti-parallel. Two plane mirrors do not constitute a retro-reflection system because they are not able to provide a second incident laser beam on the movable mirror parallel to the first reflected laser beam regardless of the plane defined by the first incident laser beam and the normal to the movable mirror.

Preferably, the device further comprises:
a second separation module to obtain from the first laterally offset laser beam or the second laterally offset laser beam a third laterally offset laser beam.

Preferably, the second separation module comprises:
a second polarizing plate to obtain:
by transmission, the first laterally offset laser beam or the second laterally offset laser beam,
by reflection, the third laterally offset laser beam.

Preferably, the second separation module comprises at least one retardation plate positioned between the first separation module and the second polarizing plate such that a rotation of the latter results in modulation of the light power distribution of the first or second laterally offset laser beam towards the first and second or towards the second and third laterally offset laser beam.

Preferably, the device of the disclosure further comprises:
a third separation module for obtaining from the one of the following offset laser beams:
first laterally offset laser beam,
second laterally offset laser beam,
third laterally offset laser beam,
a fourth laterally offset laser beam.

Preferably, the third separation module comprises:
a third polarizing plate to obtain:
by transmission, the first, second or third laterally offset laser beam,
by reflection the fourth laterally offset laser beam.

Preferably, the third separation module comprises a third half-wave plate positioned between the first separation module and the third polarizing plate or between the second separation module and the third polarizing plate such that rotation thereof causes modulation of the light power distribution of the second or third laterally offset laser beam to the third and fourth laterally offset laser beam.

According to a third aspect, one of the purposes of the present disclosure is to provide an optical machining system for performing precessional machining with at least two laser beams from a single laser source spatially separated (e.g. laterally) by a single spatial offsetting unit, so that multiple machining operations can be performed simultaneously from a single offset laser beam.

For this purpose, the inventors propose a multiple machining system comprising:
a laser source to generate an input laser beam;
an optical device as described above;
a first and a second deflection means positioned downstream of the separating unit so as to impose an angular offset to the first and second spatially offset laser beams;
a first and a second focusing means positioned downstream of the first and second deflection means respectively, so as to focus the first and second spatially offset laser beams onto at least one workpiece, preferably onto two workpieces.

Preferably, the machining system of the disclosure further comprises a unit for controlling deflection means suitable for emitting a signal to a deflection means, the controlling unit being configured to emit a common control signal to each of the deflection means.

The advantage of the optical system of the disclosure is that at least two scanners can be controlled with a same controller in order to be able to perform identical machining on the same workpiece or on at least two different workpieces. This is advantageous because the inventors have demonstrated that a single controller can control at least two scanners with the same signal. Thus, in addition to simplifying the system in terms of the number of sources and the number of lateral offsetting units, the system allows a reduced number of scanner controllers to be embedded. Alternatively, it is possible to control the scanners with different controllers.

In another preferred variant, the machining system of the disclosure comprises a unit for controlling deflection means suitable for emitting a different control signal to the first deflection means and to the second deflection means.

Preferably, the machining system of this preferred embodiment further comprises power modulators after the separating unit to be able to have different firing signals.

Preferably, the focusing means are F-theta lenses.

The F-theta focusing means are known to the person skilled in the art and allow the light beam to be focused in a same plane with a controlled angle of incidence on the workpiece, regardless of the orientation imposed by the scanner.

The different variants and advantages described for the method according to the first aspect and the device according to the second aspect of the disclosure apply to the optical device according to the second aspect, mutatis mutandis.

DESCRIPTION OF THE DRAWINGS

These and other aspects of the disclosure will be clarified in the detailed description of particular embodiments of the disclosure, reference being made to the drawings of the figures, in which:

FIG. 1 shows an embodiment of the optical device according to the disclosure;

FIG. 2 shows an embodiment of the optical system according to the disclosure;

FIGS. 3a, 3b, 4a, 4b and 4c show preferred embodiments of the device and the optical system according to the disclosure;

The drawings of the figures are not to scale. Generally, similar elements are denoted by similar references in the figures. The presence of reference numbers in the drawings cannot be considered limiting, even when these numbers are indicated in the claims.

DETAILED DESCRIPTION

Figure 3A:
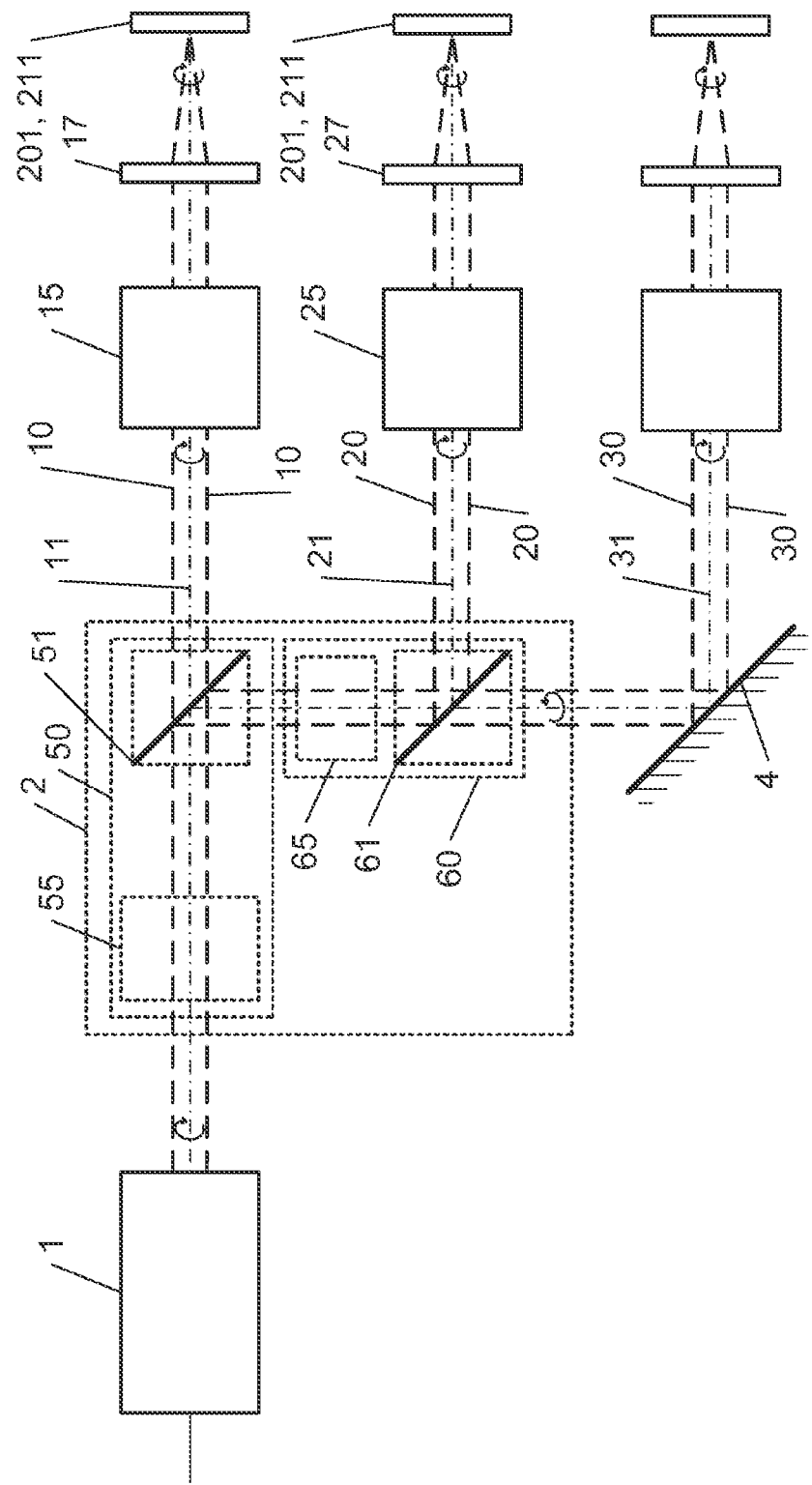

FIG. 1 shows an example of an embodiment of the optical device according to the disclosure. The optical device according to the disclosure comprises a lateral offsetting unit 1 allowing to laterally offset a laser beam with respect to a main axis A. An example of an offset particularly useful for laser machining applications is an offset with respect to the main axis A having a constant radius and making one revolution around the main axis A without cutting it. The offset laser beam 7 is then parallel to the main axis A for any position of the offset laser beam 7 around the main axis A. Thus, a projection of the offset laser beam 7 in a plane perpendicular to the main axis A describes a circle. Such a projection can also describe an ellipse or a line. Downstream of the lateral displacement unit, the offset laser beam 7 is directed to a separating unit 2 of the beam 7 so that from the offset beam 7, two laterally offset beams can be obtained, namely a first laterally offset beam 10 and a second laterally offset beam 20. These two beams 10 and 20 separated by the separating unit 2 are for example sent to deflection means and/or focusing means.

The separating unit comprises a first separation module 50 comprising at least one retardation plate 55 and a polarizing cube 51, so that the offset laser beam 7 passes through the at least one retardation plate 55 and then enters the polarizing cube so that the offset laser beam 7 is separated into a reflected beam fraction 20 and a transmitted beam fraction. The first laterally offset beam 10 corresponding to the transmitted fraction is transmitted so that it is always laterally offset with respect to a first main propagation axis 11. The second laterally offset laser beam 20 corresponds to the reflected fraction so that it is always laterally offset with respect to a second main propagation axis 21. The lateral offset of the first 10 and second 20 laterally separate laser beams is maintained with respect to their respective first 11 and second 21 propagation axis. The main propagation axis of the offset laser beam 7 before it enters the separation cube 51 corresponds to the first main propagation axis of the transmitted offset laser beam. The main propagation axes are transmitted and reflected in the same way as a laser beam that is offset by the polarizing cube 51.

FIG. 2 shows an embodiment of the machining optical system according to the disclosure. The optical system according to the disclosure comprises, in the direction of propagation of a laser beam, a laser source 3 upstream of a collimator 6 which is optional, a lateral offsetting unit 1, a separating unit 2. As explained for FIG. 1, a first offset laser beam 10 exits from the separating unit 2 and is directed to a first deflection means 15 so as to be directed to a workpiece 201, 211 passing through first focusing means 17. A second offset laser beam 20 that exits the separating unit 2 is directed to a second deflection means 25 so as to be directed to a workpiece 201, 211 by passing through a first focusing means 24. Such a configuration makes it possible to perform precession machining on at least one workpiece 201, 211. A preferred embodiment comprises a mirror 4 positioned with an angle of 45° between its normal and the second main propagation axis of the offset laser beam 20 in order to make the first 10 and second 20 offset laser beams parallel.

Figure 3B:
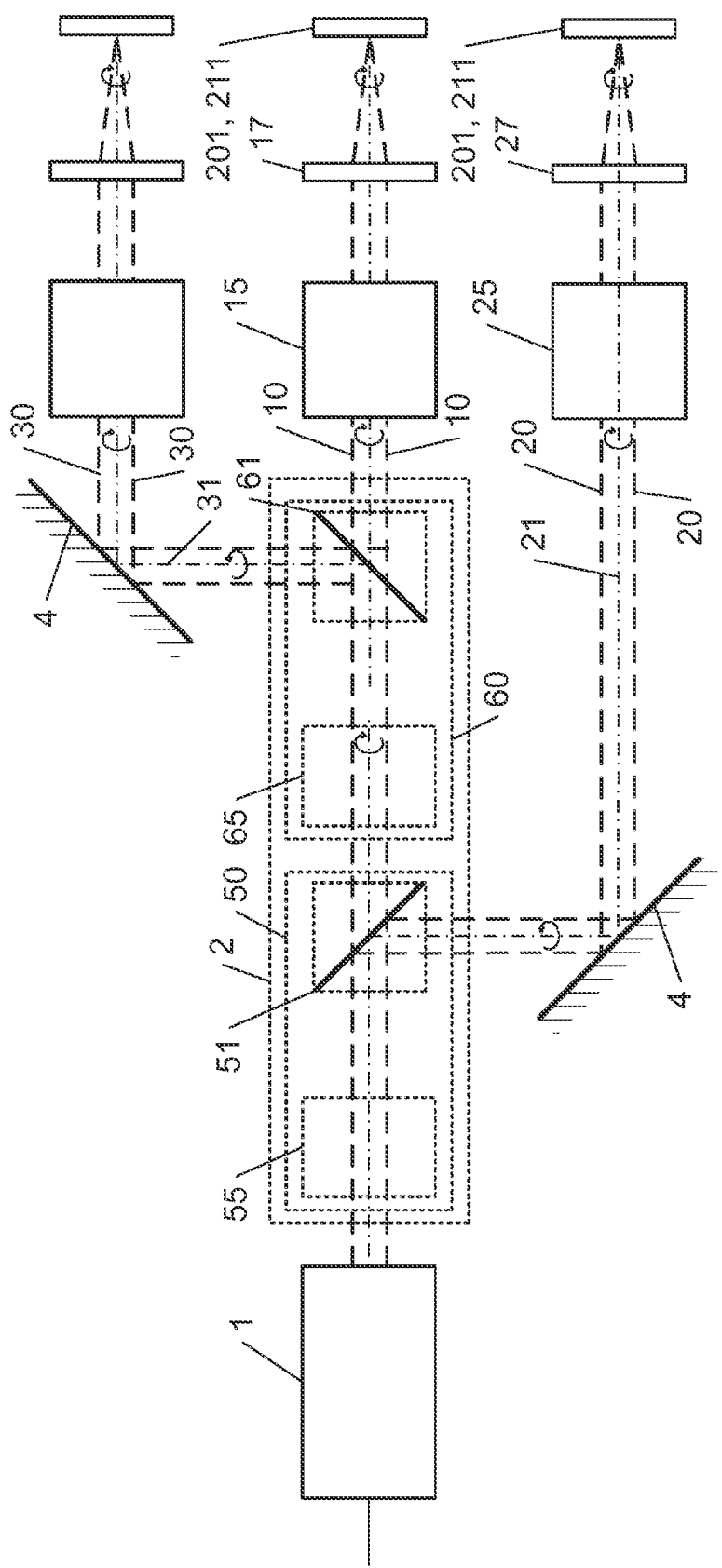

FIGS. 3a and 3b describe two preferred embodiments of the optical device and system according to the disclosure. In FIGS. 3a and 3b, the separating unit 2 comprises a second separation module 60. The second separation module 60 is identical to the first separation module 50 and in fact comprises at least one retardation plate 65 and a polarization separation means 61. In FIG. 3a, the second separation module 60 is positioned to separate the second offset laser beam 20 into a second offset laser beam 20 and a third offset laser beam 30 around a main propagation axis 31. In FIG. 3b, the second separation module 60 is positioned to separate the first offset laser beam 10 into a third offset laser beam 30 about a main propagation axis 31. Thus the embodiments described in FIGS. 3a and 3b describe two embodiments of the separating unit 2 allowing a separation of an initial offset laser beam into three offset laser beams 10, 20 and 30. The three offset laser beams are intended to be used to perform three machining operations simultaneously.

Figure 4C:
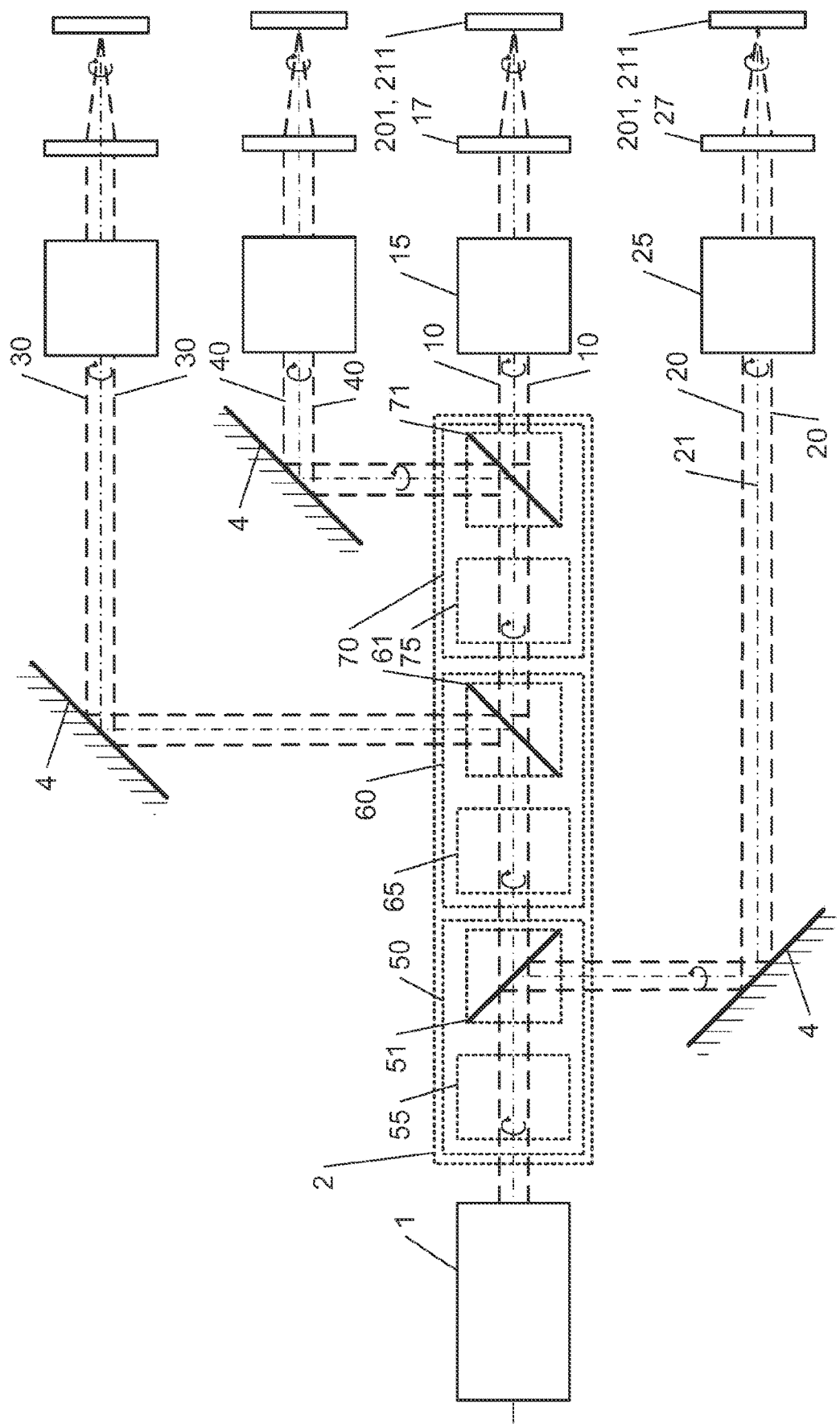

The embodiments of FIGS. 4a, 4b, and 4c are based on the embodiments of FIGS. 3a and 3b, so that the separating unit 2 comprises a third separation means 70 for separating an incident offset laser beam 7 into four offset laser beams 10, 20, 30, and 40. Thus a third separation module 70 is identical to the first separation module 50 and in fact comprises at least one retardation plate 75 and one polarizing means 71.

In FIG. 4a, the second separation module 60 is positioned to separate the second offset laser beam 20 into a second offset laser beam 20 and a third offset laser beam 30 about a main propagation axis 31. In addition, the third separation module 70 is positioned to separate the third offset laser beam 30 into a fourth offset laser beam 40 about a main propagation axis 41.

In FIG. 4b, the second separation module 60 is positioned to separate the first offset laser beam 10 into a third offset laser beam 30 about a main propagation axis 31. In addition, the third separation module 70 is positioned to separate the second offset laser beam 20 into a fourth offset laser beam 40 about a main propagation axis 41.

In FIG. 4c, the second separation module 60 is positioned to separate the first offset laser beam 10 into a third offset laser beam 30 around a main propagation axis 31. In addition, the third separation module 70 is positioned so as to separate the first offset laser beam 10 into a fourth offset laser beam 40 around a main propagation axis 41.

Thus the embodiments described in FIGS. 4a, 4b and 4c describe three embodiments of the separating unit 2 allowing a separation of an initial offset laser beam into four offset laser beams 10, 20, 30 and 40. The four offset laser beams are intended to be used to perform four machining operations simultaneously.

Figure 5:
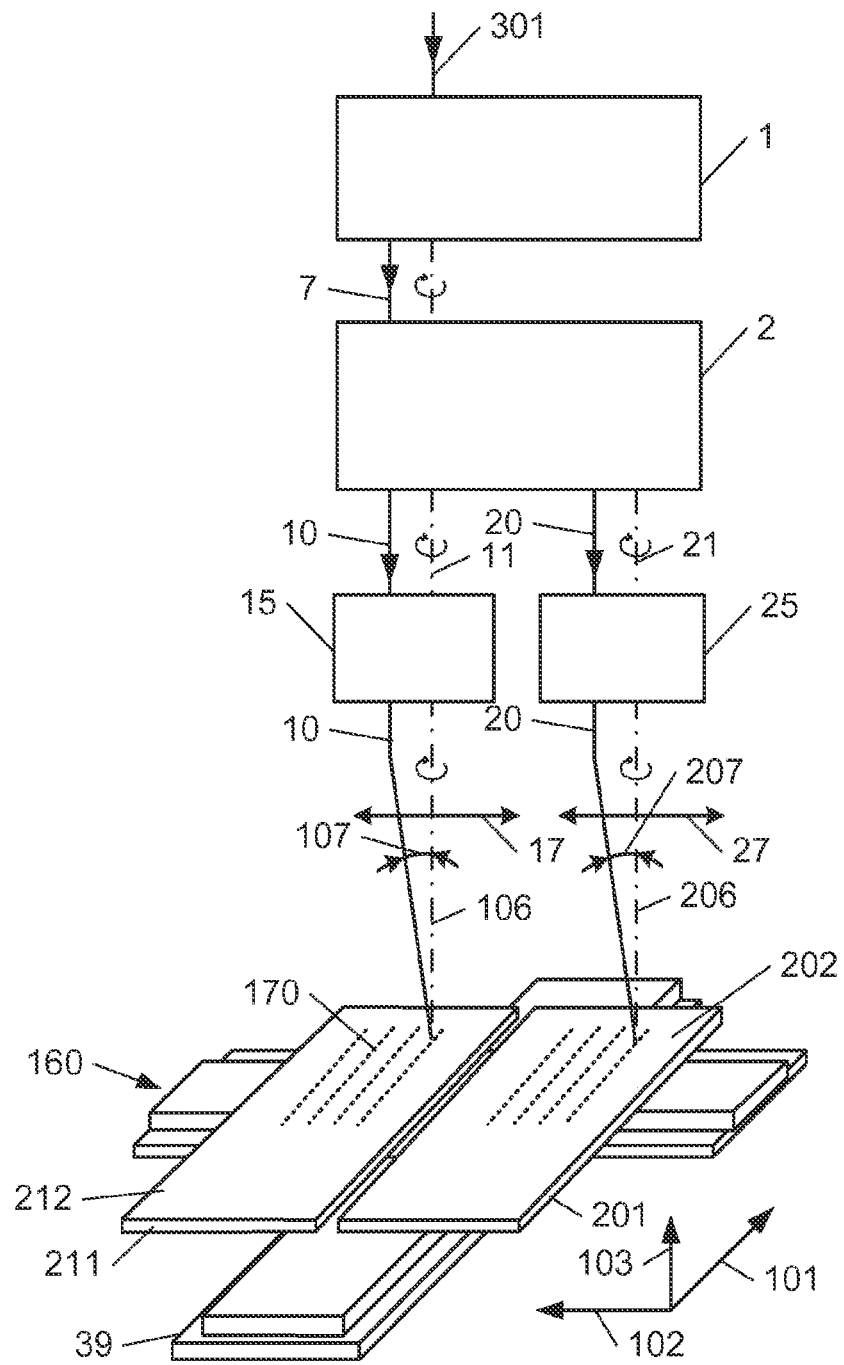
FIG. 5 shows an embodiment of the device and the optical system according to the disclosure.

FIG. 5 shows an example of an embodiment of the optical device and in particular the optical machining system. The optical machining device comprises a spatial offsetting unit 1 (lateral) suitable for spatially offsetting the incident light beam 301 so that it describes a circle in a plane perpendicular to this main propagation axis A. The particularity of this spatial offsetting unit 1 (lateral) is to allow a conservation of the same polarization to between the input laser beam 301 and the offset laser beam 7, i.e. the spatial offset (lateral) of the laser beam does not cause it to rotate on itself. The offset laser beam 7 is then separated by the separating unit 2 as described in one of the previous FIGURES. The optical machining device also comprises one or more focusing means 17, 27 to focus the outgoing light beam 7 after it has been separated by the separating unit 2 onto a part or a workpiece 201, 211. The rotational movement of the outgoing light beam 7 generated by the rotation of the mirror 119 upstream of the focusing means 17, 27 produces the precession movement of the outgoing light beam 7 downstream of the focusing means 17, 27. The precession movement of the outgoing light beam 7 is preferably produced at a point, spot or small area on a substrate 201, 211 to be structured or machined. The precession movement is illustrated in FIGS. 2, 3a, 3b, 4a, 4b, 4c, 5, 6a and 6b by arrows describing a portion of a circle. Finally, the device comprises displacement means 160 allowing to displace at least a part or workpiece 201, 211 with respect to the outgoing light beam 7. The displacement means 160 allow for example to displace the substrate according to the directions 101, 102 and 103. The directions 101, 102 and 103 preferably define a three-dimensional Cartesian coordinate system. The directions 101 and 102 defining for example a direction X and a direction Y. The direction Z defining the direction of the main axis A.

Figure 6A:
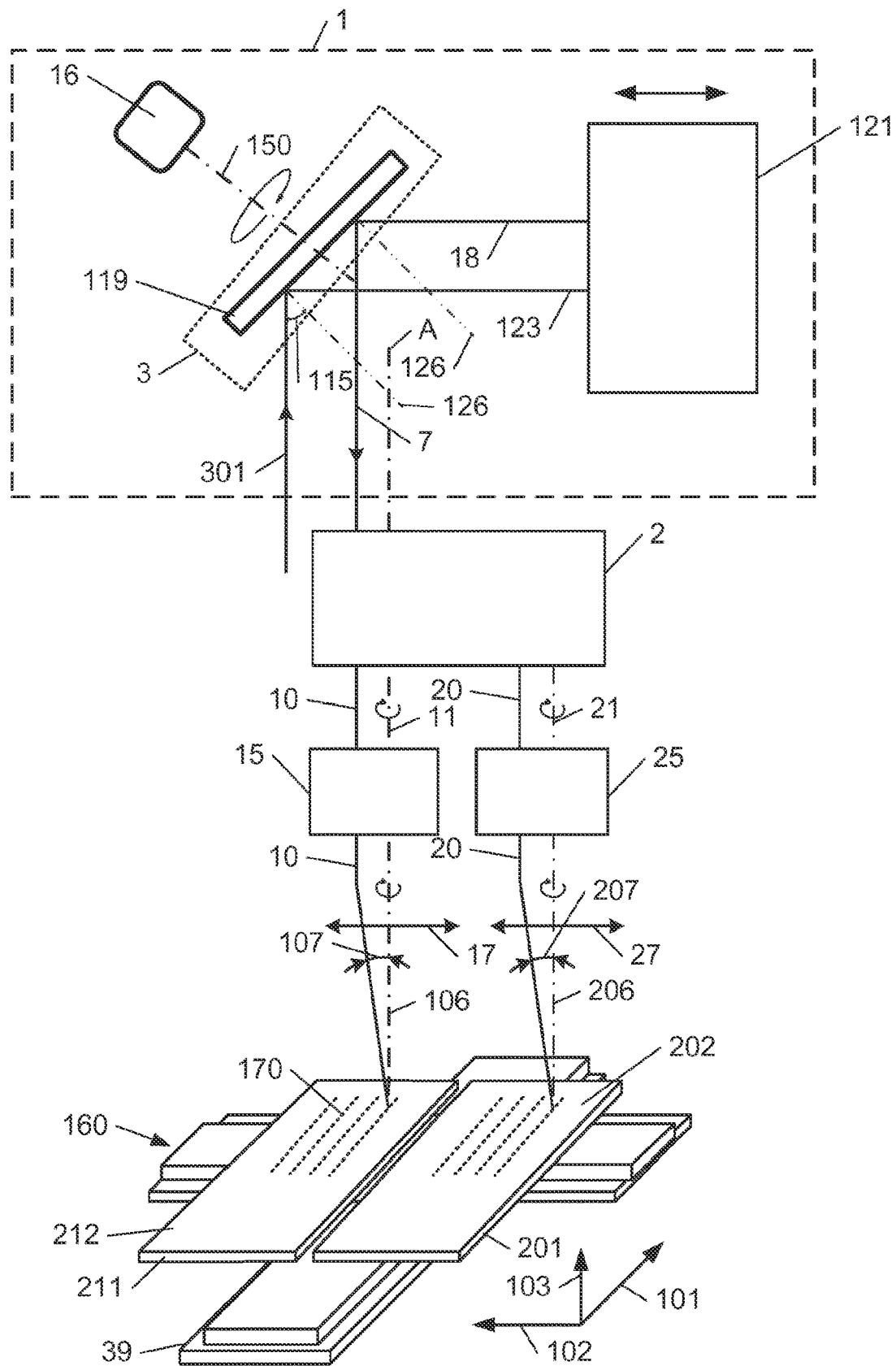
FIGS. 6a and 6b show the embodiments of the device and the optical system according to the disclosure.
Figure 6B:
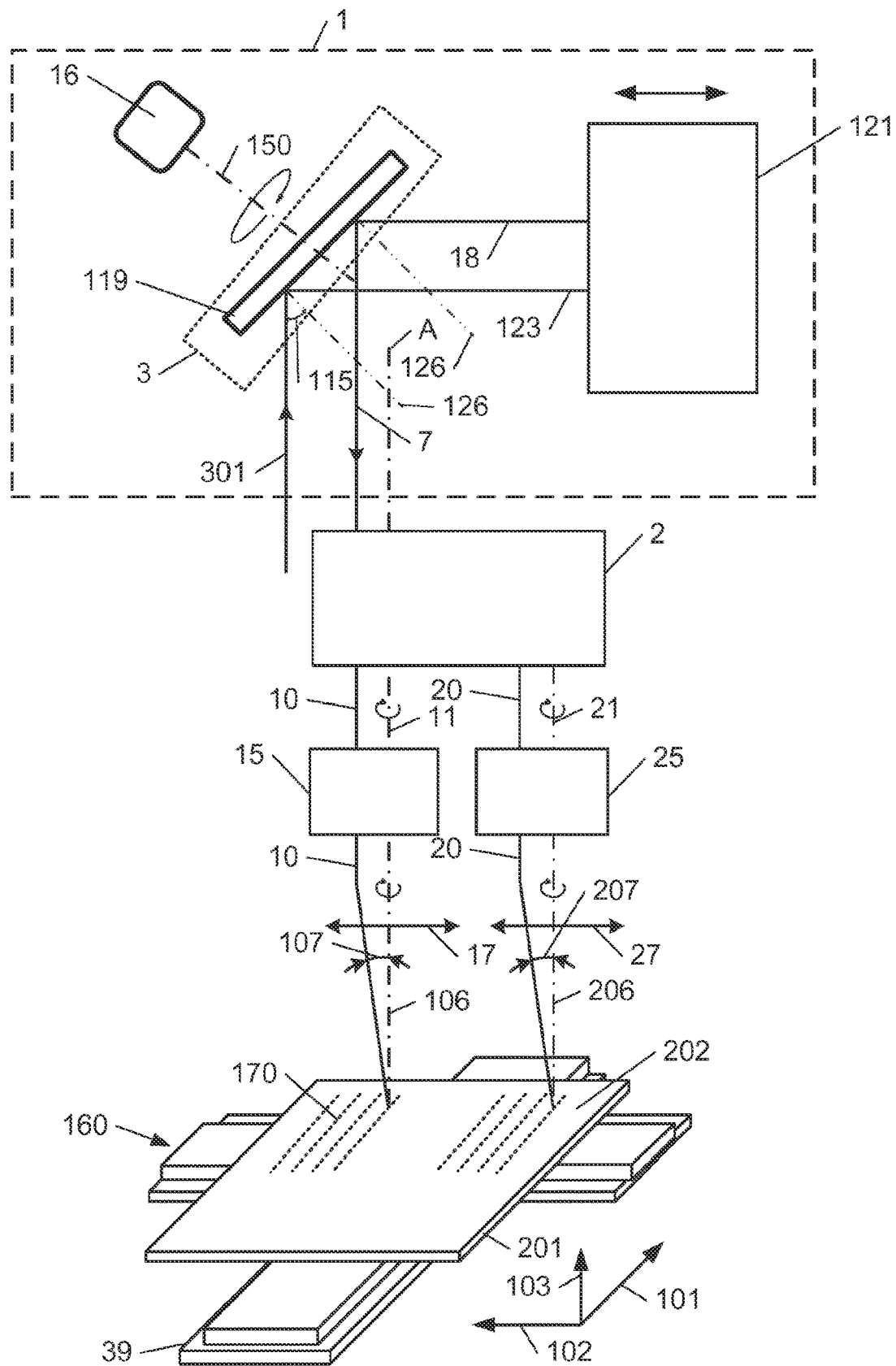

FIGS. 6a and 6b show the embodiments of the optical device and in particular of the optical machining system in FIG. 5. In these two embodiments, the incoming light beam 14 entering the lateral offsetting unit 1 is a light beam generated by the laser source 3 and preferably traveling outside the lateral offsetting unit 1 before entering it. The lateral displacement unit 1 comprises a mirror 119 which provides a first reflected light beam 123 by reflecting the incident light beam 14. The lateral offsetting unit 1 also comprises a retro-reflection system 121 that allows to redirect the first reflected light beam 123 on the mirror 119. In other words, the second incident light beam 18 in the direction of the mirror 119 is obtained by the passage of the first reflected light beam 123 through the retro-reflective system 121. The second incident light beam 18 is then reflected by the mirror 119 and forms an outgoing light beam 7. For example, the lateral offsetting unit 1 is configured in such a way that the outgoing light beam 7 can be spatially offset with respect to the incoming light beam 14 while remaining parallel to the direction of the incoming light beam 14 upstream of a focusing means 17, 27. In the example shown by these two embodiments, the incoming light beam 14 and the outgoing light beam 7 are transversely offset. Preferably, the mirror 119 can be rotated completely around a rotation axis 150 and driving means 16 allow the mirror 119 to be rotated around its rotation axis 150. The lateral offsetting unit 1 is configured so that the first incident light beam 14 and the normal 126 to the mirror 19 are separated by an angle 115 between 0° and 150 for all the possible positions and orientations of the movable mirror 119. This angle 115 is not shown to scale in FIGS. 6a and 6b for reasons of clarity of the FIGURES. The lateral offsetting unit 1 is configured in such a way that a change of position between the mirror 119 and the retro-reflective system 121 can induce a change in the offset between the incoming 14 and the outgoing 7 light beams. The optical system is, for example, mounted on a displacement stage 160 which can move in both directions 101 and 102. In the embodiments shown in FIGS. 6a and 6b, depending on the angular position of the movable mirror 119, the outgoing light beam 7 will follow a different path. Preferably each of the trajectories of the outgoing light beam 7 obtained for each of the angular positions of the movable mirror 119 are parallel. The optical machining device also includes one or more focusing means 17, 27 to focus the outgoing light beam 7 after its separation by the separating unit 2 on a part or a workpiece 201, 211. The rotational movement of the outgoing light beam 7 generated by the rotation of the mirror 119 upstream of the focusing means 17, 27 produces the precession movement of the outgoing light beam 7 downstream of the focusing means 17, 27. The precession movement of the outgoing light beam 7 is preferably produced at a point, spot or small area on a substrate 201, 211 to be structured or machined. The precession movement is illustrated in FIGS. 2, 3a, 3b, 4a, 4b, 4c, 5, 6a and 6b by arrows describing a portion of a circle. Finally, the device comprises displacement means 160 allowing to displace at least a part or workpiece 201, 211 relatively to the outgoing light beam 7. The displacement means 160 allow for example to displace the substrate according to the directions 101, 102 and 103. The directions 101, 102 and 103 preferably define a three-dimensional Cartesian coordinate system.

In addition to the driving means 16 allowing the rotation of the movable mirror 119, means for imposing a translational movement of the movable mirror 119 and/or means for changing the inclination of the movable mirror 119 may be present (mirror 119 tiltable in two or more non-parallel directions and driving means suitable for changing the inclination of the mirror 119, these driving means being for example a piezoelectric system). The interest of combining a translational movement and a rotational movement of the mirror 19 is to generate, by the relative rotational movement between the mirror 119 and the retro-reflection system 121, a precession of the outgoing light beam 7 downstream of the focusing means 17, 27, and, by the relative translational movement between the mirror 119 and the retro-reflection system 121, to modify the angle of attack 107, 20, 7 with the surface 202, 212 of the workpiece 201, 211. Examples of driving means are electric motors, brushless motors.

The retro-reflection system 121 included in the offsetting unit 1 comprises, for example, a Dove prism and a right-angled isosceles prism. Another embodiment of a retroreflection system includes for example a Dove prism, a right-angled isosceles prism, a half-wave plate, a roof prism and a polarizing semi-reflecting mirror.

The embodiments of FIGS. 5, 6a and 6b also comprise a separating unit that allows to separate the beam into a first 10 and second 20 offset laser beams which are then directed to first 15 and second 25 deflection means so as to direct the first 10 and second 20 offset laser beams to one or more workpieces 201, 211. Thus the focusing means 17, 27 allow to focus the first 10 and a second 20 offset laser beams on the surface 202, 212 of the parts 201, 211 with an angle of attack 107, 207 with respect to a normal 106, 206 on the surface 202, 212 of the workpieces 201, 211 respectively.

Figure 7A:
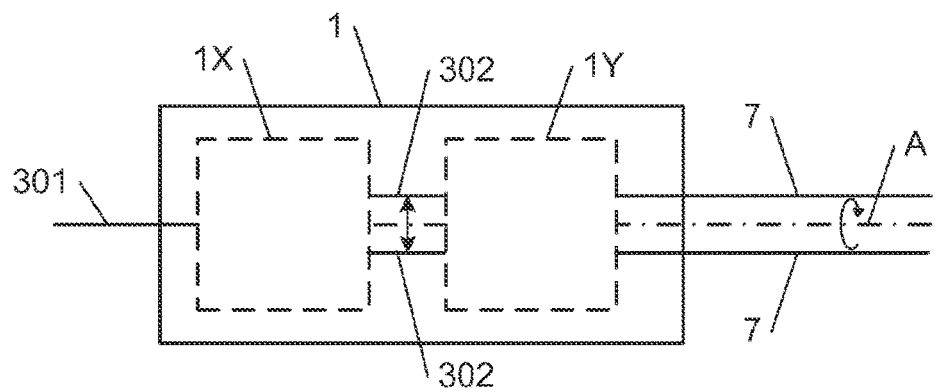
FIGS. 7a, 8a, 8b, 8c, 8d, 8e show embodiments of spatial offsetting unit.

FIG. 7a shows a spatial offsetting unit 1 (lateral) to offset spatially (laterally) an incoming light beam (laser) 301 into an offset light beam (laser) 7 having a main propagation axis A and suitable for describing a circle in a plane perpendicular to this main propagation axis A. This spatial offsetting unit 1 (lateral) comprises a first lateral offsetting unit 1X and a second lateral offsetting unit 1Y configured such that:
  the first lateral offsetting unit 1X allows to offset the incoming beam 301 into a laterally offset beam 302 according to a direction X or Y in a plane perpendicular to the main propagation axis A, and,
  the second lateral offsetting unit 1Y allows to offset the laterally offset beam 302 according to the direction X or Y not offset by the first lateral offsetting unit 1X into an offset beam 7 having a main propagation axis A and suitable for describing a circle in a plane perpendicular to this main propagation axis A.

The laterally offset beam 302 describes a line in a plane perpendicular to this main propagation axis A.

Figure 7B:
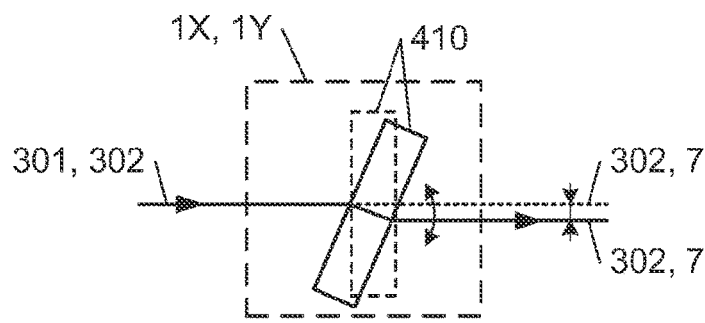
FIGS. 7b, 7c, 7d show embodiments of lateral offsetting unit.

FIG. 7b shows a first or second lateral offsetting unit 1X, 1Y comprising a plate 410 with a refractive index greater than air or vacuum. The plate 410 is tilted so that for all its orientations, the incoming light beam 301 or the laterally offset light beam 302 is transmitted by the plate 410. When the plate is tilted from a first position to a second position, the light beam 301, 302 is laterally offset 302, 7 according to a line, or according to a circle if the beam 302 was already offset along a line when it passed through the plate 7. The tilt corresponds to tilting the plate so that the beam 301, 302 has an angle of incidence on plate 410 that varies. The rounded arrow represents the tilt of the plate 410. The solid line plate represents a first plate position and the dashed line plate represents a second position of the plate 410. The offset light beam 302, 7, when offset by the plate 410 to the first position is shown as a solid line and when offset by the plate 410 as a dashed line is shown as a dashed line.

Figure 7C:
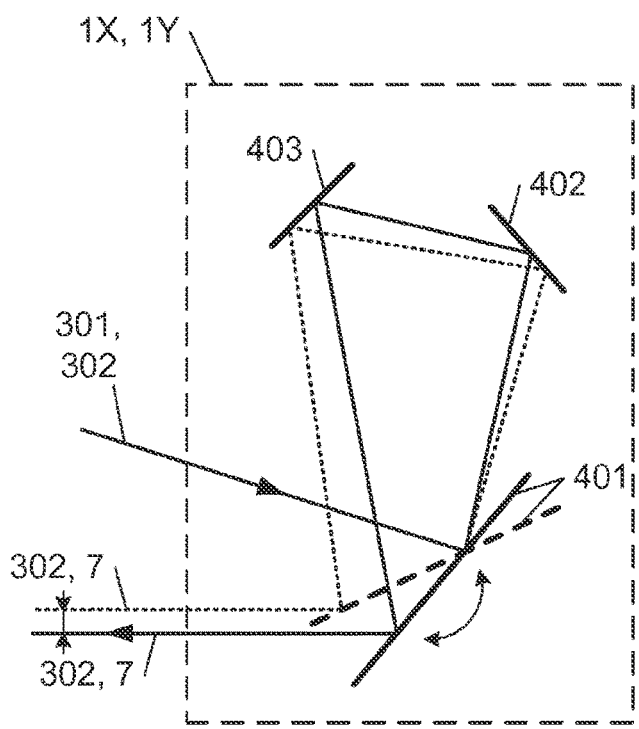

FIG. 7c shows a first or second 1X, 1Y lateral offsetting unit comprising a movable mirror 401 (the movable mirror is preferably tiltable, i.e., rotatable about an axis), a first 402 and a second 403 fixed mirrors configured as:
  that a first input reflection of the laser beam 301, 302 on the movable mirror 401 is directed towards the first fixed mirror 402,
  that a second reflection on the first fixed mirror 402 is directed towards the second fixed mirror 403,
  that a third reflection on the second fixed mirror 403 is directed towards the movable mirror 401, and, that a fourth output reflection on the movable mirror 401, allow to obtain for all the possible positions and orientations of the movable mirror, an offset laser beam 302, 7 according to a direction X and/or Y respectively. In this embodiment, the laser beams are for example in the same plane. In this embodiment, the orientations of the mirrors can be adjusted so as to modify the trajectories of the incoming 301, 302 and outgoing 302, 7 beams.

Figure 7D:
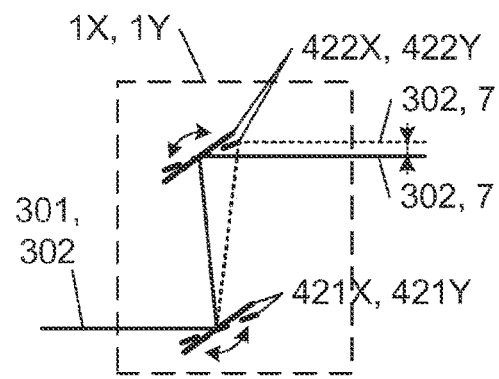

FIG. 7d shows a first or a second lateral offsetting unit 1X, 1Y comprising a first movable mirror 421 and a second movable mirror 422 so that their normals are able to describe a trajectory in a two-dimensional space. The first 421 and second 422 movable mirrors are movable so that their surfaces or normals are always parallel. The displacement of the mirrors 421, 422 is synchronized so that for any displacement of the mirrors 421, 422, the outgoing beams 302, 7 are always parallel within them. An incoming beam 301, 302 directed to the first movable mirror 421 undergoes a first reflection of the incoming laser beam on the first movable mirror 421, this reflection is directed to the second movable mirror 422, so that a second reflection on the second movable mirror 422 results in an offset laser beam 302, 7. The offset laser beam 302, 7 is obtained for all the possible positions and orientations of the first 421 and second 422 movable mirrors. The obtained offset beam is preferably according to one line, i.e. a scan of the offset laser beam 302, 7 occurs along a straight line.

Figure 8A:
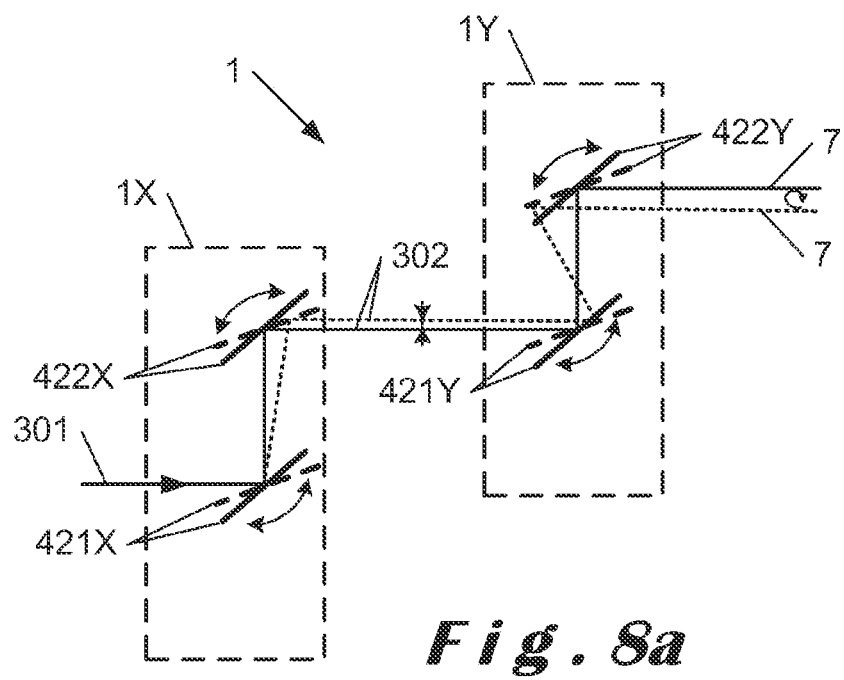

FIG. 8a shows an embodiment of a spatial offsetting unit 1 comprising two lateral offsetting units 1X, 1Y as described in FIG. 7d. The incoming beam 301 is laterally offset by a first lateral offsetting unit 1X into a laterally offset beam 302. The laterally offset beam 302 is offset such that for all the mirror positions 421X, 422X, the laterally offset beam 302 scans a straight line. This straight line follows an axis X in a plane perpendicular to the propagation of the offset beam 302. The lateral offset beam 302 then enters a second lateral offsetting unit 1Y allowing it to be offset according to the direction Y that was not offset by the first lateral offsetting unit 1X. The offset beam 302 is laterally offset by the second lateral offsetting unit 1Y into an offset beam 7 as a result of the reflection of the laterally offset beam 302 on the first 421Y and second 422Y movable mirrors. A spatially offset beam is then obtained so that it can describe a circle in a plane perpendicular to the main propagation axis A. This embodiment allows to keep the same polarization between the input laser beam 301 and the offset laser beam 7.

Figure 8B:
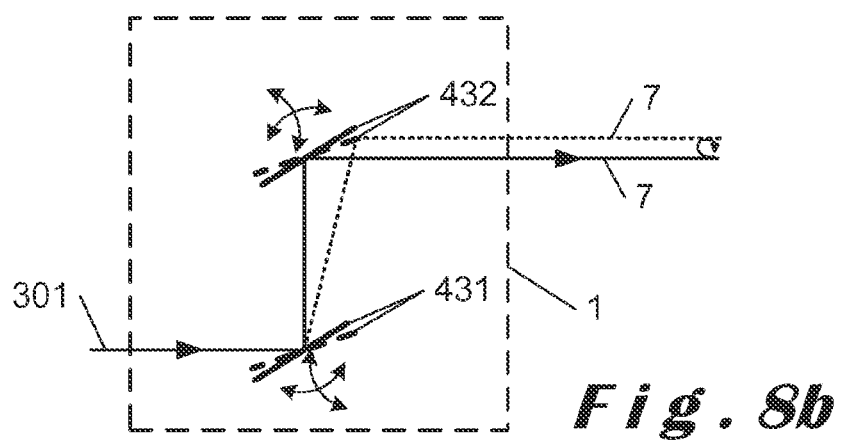

FIG. 8b shows an embodiment of a spatial offsetting unit 1 comprising a first movable mirror 431 and a second movable mirror so that their normals are suitable for describing a trajectory in a three-dimensional space. The first 431 and second 432 movable mirrors are movable so that their surfaces or normals are always parallel. An incoming beam 301 directed to the first movable mirror 431 undergoes a first incoming reflection of the laser beam on the first movable mirror 431, this reflection is directed to the second movable mirror 432, so that a second reflection on the second movable mirror 432 results in an offset laser beam 7 having a main propagation axis A and suitable for describing a circle in a plane perpendicular to this main propagation axis A. The offset laser beam 7 is obtained for all the possible positions and orientations of the first 421 and second 422 movable mirrors. The beam offset obtained is preferably according to a circle, i.e. a scan of the offset laser beam 7 occurs about a circle. Preferably, the normals of the first 431 and second 432 movable mirrors each describe a circle during the displacement of the mirror 431, 432. This embodiment allows to keep the same polarization between the input laser beam 301 and the offset laser beam 7.

Figure 8C:
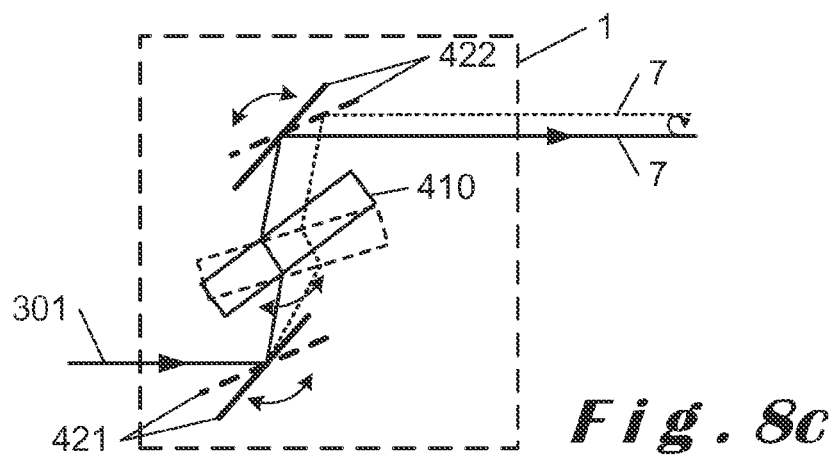

FIG. 8c shows an embodiment of a spatial offsetting unit 1 comprising the lateral displacement unit 1X, 1Y of FIG. 7d in which a tiltable plate 410 is inserted between the first 421 and second 422 movable mirrors (tiltables). Thus, the first 421 and second 422 tiltable mirrors allow the light beam to be displaced according to a direction X (Y), the tiltable plate then allows the same light beam to be displaced according to a direction Y (X). This configuration could be envisaged by positioning the plate 410 upstream of the first movable mirror 421 or downstream of the second movable mirror 422. The configuration shown in FIG. 8c is nevertheless particularly compact. The combination of the two movable mirrors (tiltable) 421, 422 and the movable plate (410) (tiltable) allows to obtain an offset laser beam 7 having a main propagation axis A and suitable for describing a circle in a plane perpendicular to this main propagation axis A, thanks to the synchronization of the displacements of the movable mirrors 421, 422 and of the mobile plate 410. This embodiment allows to keep the same polarization between the input laser beam 301 and the offset laser beam 7. Preferably, the embodiment of FIG. 8c is a combination of the embodiments of FIGS. 7b and 7d.

Figure 8D:
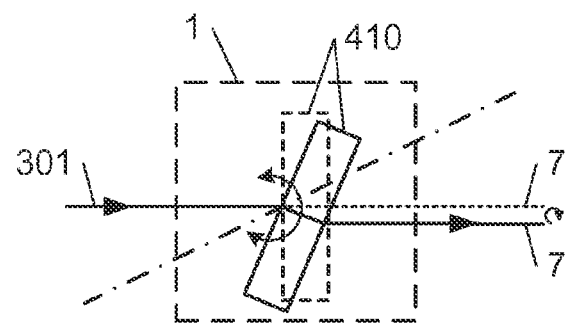

FIG. 8d shows an embodiment of a spatial offsetting unit 1 comprising an improvement of the lateral offsetting unit 1X, 1Y shown in FIG. 7b. The improvement regards the motion of the plate 410. In this embodiment shown in FIG. 8d, the plate 410 is set in motion so that its normal describes a trajectory in three-dimensional space, e.g. as its normal describes a circle. For example, its normal describes a circle about an axis passing through the point of incidence of the incoming beam 301 with the plate 410, the axis not being parallel to the incoming beam 301, i.e., not merged with the incoming beam 301. Such an axis is represented by the dashed line. This embodiment of a spatial offsetting unit 1 makes it possible to obtain an offset laser 7 having a main propagation axis A and being able to describe a circle in a plane perpendicular to this main propagation axis A, in particular when the normal of the plate 410 describes a circular trajectory around the axis. This embodiment allows conserve a same polarization between the input laser beam 301 and the offset laser beam 7.

Figure 8E:
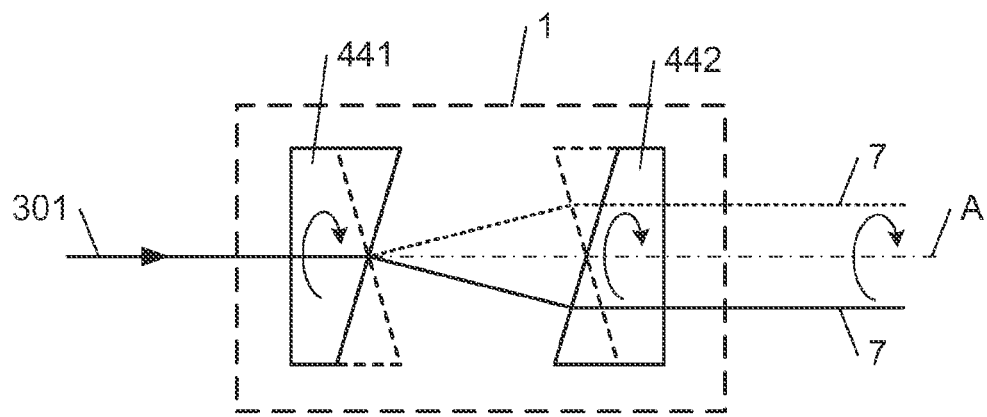

FIG. 8e shows an embodiment of a spatial offsetting unit 1 comprising a first wedge prism 441 and a second wedge prism 442, each of the two wedge prisms 441, 442 suitable for being rotated about an axis as shown in FIG. 8e. The two wedge prisms 441, 442 are rotated synchronously. Preferably, they are rotated so that the sum of their thicknesses at any point in a direction parallel to their axis of rotation is equal. Preferably both wedge prisms 441, 442 have identical wedge prism angles. Thus the passage of the light beam through the two wedge prisms 441, 442 during their synchronized rotations makes it possible to obtain an offset laser 7 having a main propagation axis A and being able to describe a circle in a plane perpendicular to this main propagation axis A. This embodiment allows to keep the same polarization between the input laser beam 301 and the offset laser beam 7.

The present disclosure has been described in relation to specific embodiments, which have a purely illustrative value and should not be considered as limiting. Generally speaking, the present disclosure is not limited to the examples illustrated and/or described above. The use of the verbs "comprise", "include", or any other variant, as well as their conjugations, can in no way exclude the presence of elements other than those mentioned. The use of the indefinite article "a", "an", or the definite article "the" to introduce an element does not exclude the presence of a plurality of such elements. The reference numbers in claims do not limit their scope.

In summary, the disclosure may also be described as follows.

A method for providing a first 10 and a second 20 laser beams spatially offset from an input laser beam 301 and comprising the following steps:
a. providing a laser source 300 to generate the input laser beam 301;
b. providing a spatial offsetting unit 1 to provide an offset laser beam 7 suitable for maintaining a common polarization between the input laser beam 301 and the offset laser beam 7;
c. providing a separating unit 2 comprising a first polarization separation module 50 per polarization to obtain from the offset laser beam 7:
the first spatially offset laser beam 10 by transmission, and
the second spatially offset laser beam 20 by reflection;
the first 10 and second 20 spatially offset laser beams each being able to describe a circle.

The invention claimed is:

1. A method for providing at least a first and a second laser beam spatially offset with respect to an input laser beam for identical precession machining of at least two workpieces or substrates simultaneously, the method comprising:
providing a laser source for generating said input laser beam such that said input laser beam has a fixed polarization in time;
providing a spatial offsetting unit for producing an offset laser beam with respect to said input laser beam, said offset laser beam having a main propagation axis A, and being suitable for describing a circle in a plane perpendicular to this main propagation axis A, said spatial offsetting unit configured to maintain the same polarization between said input laser beam and said offset laser beam;
providing a separating unit comprising a first polarization separation means for obtaining from said offset laser beam:
the first spatially offset laser beam by transmission having a first main propagation axis, and
the second laser beam spatially offset by reflection having a second main propagation axis;
said separating unit being configured such that said first and second spatially offset laser beams are suitable for describing a circle in a plane perpendicular to said first and second main propagations axes respectively.

2. The method according to claim 1, wherein said spatial offsetting unit is suitable for changing a spatial offset between said input laser beam and said offset laser beam.

3. The method according to claim 1, wherein said separating unit includes a first separation module comprising a polarization management means upstream of said first polarization separation means.

4. The method according to claim 3, wherein said polarization management means comprises a retardation plate so that a rotation of said retardation plate induces a modulation of a transmitted power and a reflected power by said first polarization separation means.

5. The method according to claim 1, further comprising:
providing a first and a second deflection means positioned downstream of said separating unit for directing said first and second spatially offset laser beams toward at least one workpiece;
providing a first and a second focusing means positioned downstream of said first and second deflection means respectively, so as to focus said first and second spatially offset laser beams onto said at least one workpiece.

6. An optical device for laser machining comprising:
a spatial offsetting unit for obtaining from an input laser beam an offset laser beam having a main propagation axis A and suitable for describing a circle in a plane perpendicular to this main propagation axis A, the input laser beam having a fixed polarization in time;
a separating unit comprising a first separation module comprising a first polarization separation means for obtaining from said offset laser beam:
a first spatially offset laser beam by transmission having a first main propagation axis, and
a second spatially offset laser beam by reflection having a second main propagation axis,
said spatial offsetting unit being configured to maintain the same polarization between said input laser beam and said offset laser beam;
said separating unit being configured such that said first and second spatially offset laser beams are suitable for describing a circle in a plane perpendicular to said first and second main propagations axes respectively,
the optical device enabling identical precession machining of at least two workpieces or substrates simultaneously.

7. The device according to claim 6, wherein the first separation module comprises a polarization management means upstream of said first polarization separation means.

8. The device according to claim 7, wherein said polarization management means comprises two retardation plates (such that a rotation of at least one of the two quarter-wave plates induces a modulation of a transmitted power and a reflected power by said first polarization separation means.

9. The device according to claim 6, wherein said spatial offsetting unit comprises:
a first lateral offsetting unit for obtaining a laser beam offset according to a direction X in a plane perpendicular to said main propagation axis A;
a second lateral offsetting unit for obtaining a laser beam offset according to a direction Y in a plane perpendicular to said main propagation axis A;
said directions X and Y being orthogonal to each other;
said first and said second lateral offsetting unit being optically coupled so that they are suitable for offsetting an input laser beam to obtain an offset laser beam suitable for describing a circle in a plane perpendicular to said main propagation axis A.

10. The device according to claim 9, wherein said first and/or said second lateral offsetting unit comprises a plate suitable for being rotated so as to offset a laser beam to obtain a laser beam offset according to a direction X and/or Y respectively in a plane perpendicular to said main propagation axis A.

11. The device according to claim 9, wherein said first and/or second lateral offsetting unit comprises:
a movable mirror so that its normal is suitable for describing a trajectory in a two-dimensional space,
an optical return system configured to redirect a first input reflection of the laser beam from said movable mirror to said movable mirror so as to obtain for all the possible positions and orientations of said movable mirror, a beam offset according to a direction X and/or Y respectively.

12. The device according to claim 11, wherein said optical return system comprises:
a first and a second fixed mirror configured such that:
a first input reflection of the laser beam on said movable mirror is directed to said first fixed mirror,
a second reflection on said first fixed mirror is directed to said second fixed mirror,
a third reflection on said second fixed mirror is directed towards said movable mirror, and,
a fourth output reflection on said movable mirror allows for all the possible positions and orientations of said movable mirror, a beam offset to be obtained according to a direction X and/or Y respectively.

13. The device according to claim 9, wherein said first and said second lateral offsetting unit comprises:
a first movable mirror, a normal of which is suitable for describing a trajectory in a two-dimensional space;
a second movable mirror, a normal of which is suitable for describing a trajectory in said two-dimensional space;
said normals of said first and second movable mirrors being parallel for all the possible positions and orientations of said first and second movable mirrors, and said first and second movable mirrors being configured such that:
a first input reflection of the input laser beam on said first movable mirror is directed to said second movable mirror;
a second reflection on said second movable mirror makes it possible to obtain, for all the possible positions and orientations of said first and second movable mirrors, a beam offset laterally according to a direction X;
a third reflection of the laterally offset beam on said first movable mirror is directed towards said second movable mirror;
a fourth reflection on said second movable mirror makes it possible to obtain, for all the possible positions and orientations of said first and second movable mirrors of said first and second lateral offsetting unit, an offset laser beam suitable for describing a circle in a plane perpendicular to its main propagation axis A.

14. The device according to claim 6, wherein said spatial offsetting unit comprises:
a first movable mirror, a normal of which is suitable for describing a trajectory in a three-dimensional space;
a second movable mirror, a normal of which is suitable for describing a trajectory in said three-dimensional space;
said normals of said first and second movable mirrors being parallel for all the possible positions and orientations of said first and second movable mirrors, and said first and second movable mirrors being configured such that:
a first input reflection of the laser beam from said first movable mirror is directed to said second movable mirror,
a second reflection on said second movable mirror makes it possible to obtain, for all the possible positions and orientations of said first and second movable mirrors, an offset laser beam suitable for describing a circle in a plane perpendicular to this main propagation axis A.

15. A multiple machining system comprising:
a laser source for generating an input laser beam;
an optical device according to claim 6;
a first and a second deflection means positioned downstream of said separating unit so as to impose an angular offset to said first and second spatially offset laser beams;
a first and a second focusing means positioned downstream of said first and second deflection means respectively, so as to focus said first and second spatially offset laser beams onto at least one workpiece.

* * * * *